Oct. 18, 1966  J. RUBINSTEIN ET AL  3,279,437
PENCIL SHARPENERS
Filed April 23, 1965
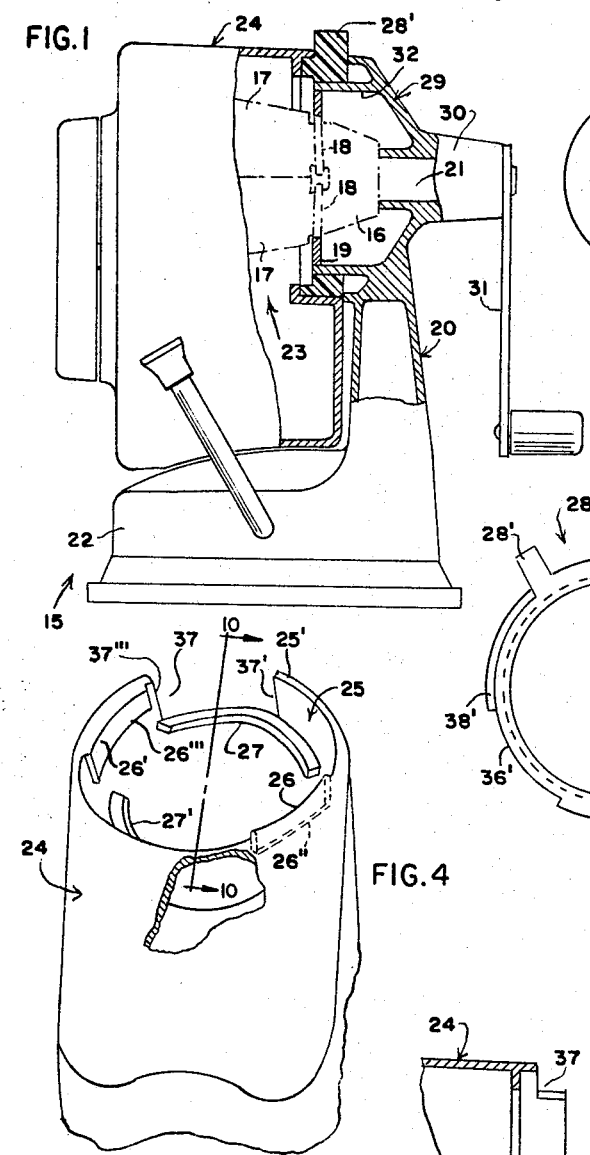
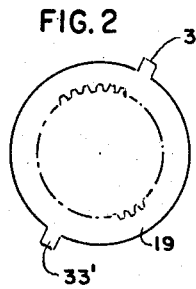
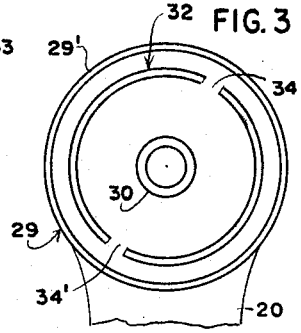
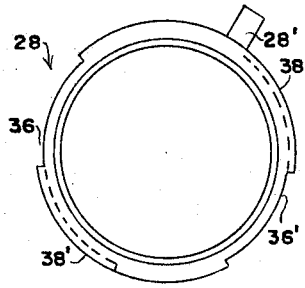
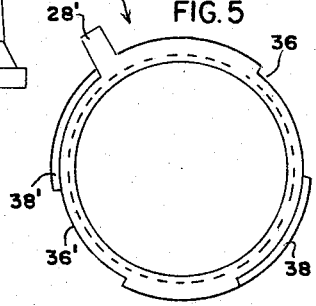
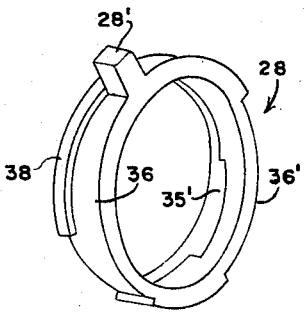
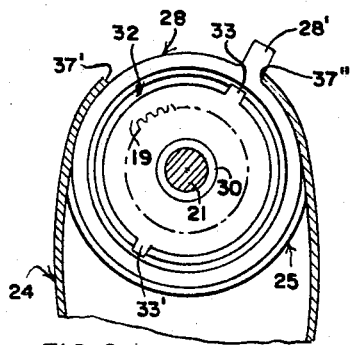
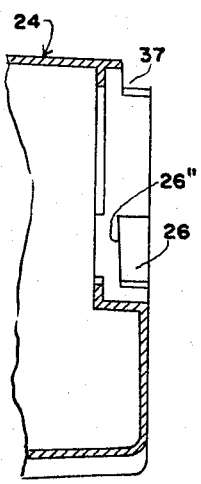
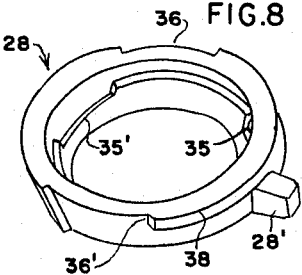
INVENTORS,
Joseph Rubinstein &
BY Harry Preble,
ATTORNEY.

3,279,437
PENCIL SHARPENERS
Joseph Rubinstein, Newburgh, and Harry Preble, Cross River, N.Y., assignors to General Slicing Machine Co., Inc., Walden, N.Y., a corporation of New York
Filed Apr. 23, 1965, Ser. No. 450,457
7 Claims. (Cl. 120—96)

The present invention relates to pencil sharpeners of the type in which a stationary standard, supporting the cutting means, has a releasably mounted casing thereon, housing said cutting means and serving to hold the shavings, and more particularly to novel and improved construction for mounting and releasing said casing.

Heretofore, the casing eccentrically mounted, had to be given a part turn to make it engage or to become disengaged from the standard. The sharpener had to be in a free space to allow the casing to be turned thereon. Also, though it was easy to disengage the casing, manipulation was cumbersome when it came to mount the casing, because it was necessary to attain a registry position and in many constructions, the casing could assume one of two positions in locked condition. Further, the axis of turn of the casing being near the top thereof, its bottom had to be of a shape that could clear the surface on which the sharpener was mounted, and where the sharpener base was a mechanical vacuum base structure, the height of the sharpener to be within the limit of accepted design, could have a comparatively small casing for the cutter means, thus materially reducing the capacity for shaving collection.

It is therefore the principal object of this invention to provide a novel and improved construction whereby the said casing has only a straight sliding movement parallel to the sharpener's base, to be mounted or dismounted. This avoids all the objectionable incidents hereinabove stated.

Another object of this invention is to provide a novel and improved pencil sharpener construction offering easy mounting and dismounting of its shavings-collection receptacle by merely the partial turn of a ring on the standard and to effect engagement and disengagement thereof.

Still another object of this invention is to provide a novel and improved pencil sharpener construction having the stated attributes and which is easy to manipulate and which is efficient in carrying out the purposes for which it is designed.

Other objects and advantages will become apparent as this disclosure proceeds.

For the practice of this invention, the pencil sharpener comprises a standard supporting a shaft which carries and is rotatable to operate cutting mechanism housed in a removable casing having a port or passage to dump the pencil shavings collected therein; said mechanism being entered into said casing through said port. A ring rotatably mounted on the standard and held thereon against lateral movement, fits rotatably in said port. Formations on said ring, releasably engage companion formations within said port whereby the casing is fixed to the standard. The ring has an accessible handle to give it a part turn between two stops. When the ring and casing are engaged, the ring is in a position determined by one of said stops. When the ring is in the position determined by the other stop, the casing becomes disengaged from the ring and is free for removal by movement away from the standard.

In the accompanying drawing forming part of this specification similar characters of reference indicate corresponding parts in all the views.

FIG. 1 is an elevational view shown partly in section, of a pencil sharpener embodying the teachings of this invention. In this structure as illustrated, the means for driving the cutters employs a planetary gearing system which includes an internal gear fixed on the standard.

FIG. 2 is a face view of said internal gear.

FIG. 3 is a fragmentary view showing the standard as seen from the left in FIG. 1. Particularly discernable in this view, are the places provided for mounting said internal gear and the locking ring.

FIG. 4 is a fragmentary perspective view of the casing, showing in particular its dumping port and the structure which cooperates with the locking ring to engage and disengage said casing.

FIG. 5 is a front view of the locking ring; front being deemed the handle-end of the sharpener.

FIG. 6 is a rear view of FIG. 5.

FIG. 7 is a front perspective view of the locking ring.

FIG. 8 is a rear perspective view of said locking ring in a position to better expose its construction.

FIG. 9 is a section taken at line 9—9 in FIG. 1, showing the casing mounted and locked on the standard.

FIG. 10 is a fragmentary section taken at line 10—10 in FIG. 4.

In the drawing, the numeral 15 designates generally a pencil sharpener having a rotatable mount 16 carrying conventional rotatable milling cutters 17, each with a gear 18 fast on its shaft, meshing with an internal gear 19 fixed on the standard 20, to form a planetary gearing assembly which is well known. Said standard, serving as a bearing for the shaft 21 carrying the mount 16 fast thereon, rises from a base 22, which in the particular embodiment illustrated, houses vacuum base structure (not shown) which for example may be of the type set forth in Patent No. 3,159,370. The cutting mechanism indicated generally by the numeral 23, is housed in a casing denoted generally by the numeral 24, which has a cylindrical port 25, near the top thereof. This port is the passage through which the cutting mechanism is entered into said casing, and out of which pencil shavings collected in said casing, are dumped when the casing is removed. The wall of this passage has inward segmental flange formations 26, 26′ and 27, 27′ which cooperate with companion formations on the ring denoted generally by the numeral 28, rotatably carried on said standard 20, to engage and disengage said casing 24, as will be described.

A dish-form 29 constitutes the upper part of the standard 20. Another part of the standard is the horizontal bearing 30 for the shaft 21 carrying the mount 16 fast thereon facing the mouth of said dish-form; said bearing and dish-from being coaxial. The outer end of the shaft 21 has a crank 31 for operating the cutting mechanism 23, or such shaft may be power-driven and is well known in the art. Concentrically inside said dish-form 29 and integral therewith is a ring 32, which extends from the floor of said dish-form and outwardly beyond the latter's mouth rim 29′, thus offering a support for the ring 28, which is rotatable thereon and bears against the mouth rim 29′ of the dish-form member 29. The internal gear 19 fits inside said ring 32 whereto it is fixed in any suitable member, and its diametrically opposite outward radial tabs 33, 33′ are held in notches 34, 34′ provided in the rim of such ring; said tabs extending a bit beyond the outer surface of said ring 32, and their distal ends are within the respective niches 35, 35′ inside the ring 28 whose edges serve as stops determining the scope of movement of the ring 28. When the casing 24 is on the standard 20 as shown in FIG. 1, the outer mouth rim 25′ of the structure offering the port 25, contacts the mouth rim 29′ of the dish-form 29, and the ring 28 is within said port, resting on the diametrically opposite internal flanges 27, 27′. Such seat may be offered by an inner ring flange, but making it in two segments 27, 27', offers openings between such segments so no shavings in the casing are caught thereby when it is desired to clean out said casing.

The segmental inward flange formations 26, 26' are really pads which are on the wall of the passage 25, and extend from the mouth rim 25' towards the general plane of the seating surfaces offered by the inward flanges 27, 27'. The ring 28 has the diametrically opposite shallow channels 36, 36' across its periphery. When the casing 24 is to be mounted on the standard 20, it is moved so its mouth rim 25' approaches the ring 28, which now faces the casing, positioned as in FIG. 6. The ring 28 enters into the passage or port 25, so that the pads 26, 26' pass respectively through the channels 36, 36', the handle 28' which extends radially outward from the ring 28, finds clearance in the notch 37, and the casing 24 is halted because the ring 28 comes to and seats on the segmental flanges 27, 27'. At this point, the casing is at what may be called the "pushed on position." The casing is free to be pulled off, and so said position may also be referred to as the "ready to be pulled off" position. The handle 28' is near notch edge 37'. As will be explained, a shift of the ring 28 so that the handle 28' is near the notch edge 37", will lock the casing to the standard, and shifting it back again, will have the casing ready to be pulled off. The notch edges 37', 37" may be used to limit ring movement between said locked and unlocked positions.

On the periphery of the ring 28, there are the diametrically opposite arcual flange segments 38, 38' which constantly rest on the seats 27, 27' respectively, are clear of the pads 26, 26' when the casing 24 is at "pushed on position" (or "ready to be pulled off position") and when the ring 28 is turned by shifting the handle 28' towards the ring 28, will enter the space between the plane of the notch edge 37", will enter the space between the plane of the seating surfaces of the flanges 27, 27' and the slanted camming surfaces 26", 26'" respectively, of the pads 26, 26', which are opposite said seating surfaces, and contact all of said surfaces whereby said ring 28 is locked to the casing 24. By such ring movement to locking position, the tabs 33, 33' will slide along the slanted surfaces of the floors of the niches 35, 35' and also add to the locking action; the side walls of said niches acting as stops to determine the scope of movement of said ring 28, otherwise said ring would be free to turn on its supporting ring 32 when the casing 24 is removed. The diameter of said ring 28 at the segments 38, 38', is for rotatable fit in the passage 25, and the remainder of the body of said ring 28 is of no greater diameter. The four mentioned slanting surfaces for camming action, slant towards the resting surfaces of the flange segments 27, 27' in the direction of turn of the ring 28 from "pushed on position" to locked position.

The arcual flange segment 38 is around a portion of the periphery of the ring 28, blocking a portion of the end of the channel 36 which is farthest from the standard 20; such arcual segment extending from one side wall of said channel towards the other side wall of said channel. The same applies to the arcual flange segment 38' with respect to the channel 36'.

Although the floor edges of the niches 35, 35' and the camming edges 26" and 26'" are described as slanted, it is only the end portion of said edges that need be high points for better frictionally engaging the tabs 33, 33' and the arcual flange segments 38, 38', and so wherever herein and in the appended claims "slant edges" are referred to, shall be deemed also to mean the high points spoken of.

The standard 20 may be a die casting, the casing 24 may be of plastic and transparent, and the ring 28 may be molded of plastic.

This invention is capable of numerous forms without departing from the essential features herein disclosed. It is therefore intended and desired that the embodiment shown herein shall be deemed merely illustrative and not restrictive and that the patent shall cover all patentable novelty herein set forth; reference being had to the following claims rather than to the specific description herein, to indicate the scope of this invention.

We claim:
1. In a pencil sharpener:
   a standard;
   a horizontal shaft rotatably mounted on said standard and extending rearwardly therefrom;
   a cutting mechanism on the rearwardly extending portion of said shaft;
   a casing for collecting pencil shavings having a cylindrical dumping port; said cutting mechanism extending into said casing through said port;
   a ring rotatably mounted on the rear of said standard extending into said port and rotatably fitted therein;
   cooperating means on said standard and ring permitting the ring movement of part of a turn between a first and a second position on said standard, and
   cooperative means on said ring and in said port releasably locking said casing to said ring when said ring is at said first position on the standard, and when said ring is at said second position on the standard, said casing being free to be moved off the ring in a direction away from said standard.

2. In a pencil sharpener:
   a standard member;
   a horizontal shaft rotatably mounted on said standard member and extending rearwardly therefrom;
   a cutting mechanism on the rearwardly extending portion of said shaft;
   a casing member for collecting pencil shavings having a cylindrical dumping port; said cutting mechanism extending into said casing member through said port;
   a ring rotatably mounted on the rear of said standard member extending into said port and rotatably fitted therein;
   cooperating means on said ring and one of said members permitting the ring movement part of a turn between a first and a second position on said standard member, and
   cooperative means on said ring and in said port releasably locking said casing to said ring when said ring is at said first position, and when the said ring is at second position on the standard member, said casing is free to be moved off the ring in a direction away from said standard member.

3. In a pencil sharpener:
   a standard member;
   a horizontal shaft rotatably mounted on said standard member and extending rearwardly therefrom;
   a cutting mechanism on the rearwardly extending portion of said shaft;
   a casing for collecting pencil shavings having a dumping port; said cutting mechanism extending into said casing member through said port;
   a ring rotatably mounted on the rear of said standard member positioned around said port and rotatably mounted on said casing member;
   cooperating means on said ring and one of said members permitting the ring movement part of a turn between a first position and a second position on said standard member, and
   cooperative means on said ring and one of said members releasably locking said ring to said one member; said ring being in constant assembly with the other of said members when said ring is at said first position on the standard member, and when the ring is at said second position on the standard member, said casing is free to be moved laterally away from said standard member.

4. In a pencil sharpener:
   a standard;
   a horizontal shaft rotatably mounted on said standard and extending rearwardly therefrom;
   a cutting mechanism carried on the rearwardly extending shaft portion;

a casing for collecting pencil shavings having a cylindrical dumping port; said cutting mechanism extending into said casing through said port;

flange structure within said port;

a locking ring rotatably mounted on the rear of said standard positioned within said port and rotatably fitted therein; said locking ring being seated against said flange structure; said ring having a channel across its periphery and an arcual flange segment around a portion of its periphery blocking a portion of the end of said channel which is farthest from said standard; said arcual flange segment extending from one side wall of said channel towards the other side wall of said channel;

a pad on the wall of said port extending along said port from the mouth of said port towards said flange structure and spaced from the plane of the seating surface thereof; said arcual flange segment being frictionally engaged by the edge of said pad which faces said plane whereby said casing is releasably locked to the ring; the unblocked portion of said end of the channel being away from said pad;

accessible handle means extending from the ring for turning said ring on said standard;

said ring being rotatable a predetermined part of a turn whereby the arcual flange segment is moved away from said pad whereupon the unblocked portion of said end of the channel is at said pad;

said pad being then capable of passing into said unblocked portion of the channel when the casing is moved away from the standard in a direction along the line of the axis of said port, and cooperative stop means on said standard and said locking ring determining the limits of said part turn.

5. A pencil sharpener as defined in claim 4, wherein the edge of the pad which contacts the arcual flange segment, is slanted whereby the ring is cammed into a relatively tight frictional hold with said pad when the casing is held fast by said ring.

6. In a pencil sharpener:

a standard;

a dish-form on said standard;

a ring extending from the floor of said dish-form and outwardly thereof, having a notch in its mouth rim;

a horizontal shaft rotatably mounted on said standard and extending rearwardly therefrom; said dish-form and ring being concentric with said shaft and said dish-form being positioned that its rim is farthest from the forward end of said shaft;

an internal gear having a radially outwardly extending tab; said internal gear being concentric with said shaft and fixed to said ring;

a locking ring bearing against the mouth rim of said dish-form and rotatably mounted on said ring, and having a channel across its periphery and an arcual segment flange around a portion of its periphery blocking a portion of the end of said channel which is farthest from said standard; said arcual flange segment extending from one side wall of said channel towards the other side wall of said channel; said locking rim having a niche in its interior wall; said tab on the internal gear extending through said notch and into said niche;

a casing for collecting pencil shavings having a cylindrical dumping port;

a cutting mechanism carried on the rearwardly extending shaft portion including rotary cutters carried on a frame which is fast on the shaft, gears fast on said cutters meshed with said internal gear; said cutting means extending into said casing through said port, and said locking ring extending within said port and rotatably fitted therein;

flange structure within said port having said locking ring seated thereagainst;

a pad on the wall of said port extending therealong from the mouth thereof towards said flange structure and spaced from the plane of the seating surface thereof; said arcual flange segment being frictionally engaged by the edge of said pad which faces said plane whereby said casing is releasably locked to said locking ring; the unblocked portion of said end of said channel being away from said pad, and accessible handle means extending from the locking ring for turning it on the standard; said locking ring being turnable a predetermined part of a turn as determined by the cooperation of the tab with the ends of said niche, whereby the arcual flange segment is turned away from said pad whereupon the unlocked portion of said end of the channel at said pad; said pad then being capable of passing through said channel by entering said unblocked portion thereof when the casing is moved away from the standard in a direction along the line of the axis of said port; said tab being in contact with one end of said niche when the casing is locked to said locking ring, and with the other end of said niche when said pad is enterable through the channel's unobstructed end portion.

7. A pencil sharpener as defined in claim 6, wherein the edge of the pad which contacts the arcual flange segment, is slanted whereby the ring is cammed into a relatively tight frictional hold when the casing is held fast by said ring, and wherein said niche has a slanted ledge between the edges determining the extent of movement permitted the said ring, whereby the tab is cammed into a relatively tight frictional hold with said ring when the casing is held fast by said ring.

References Cited by the Examiner
UNITED STATES PATENTS

| | | | |
|---|---|---|---|
| 1,305,855 | 6/1919 | Wilson | 120—94 |
| 1,393,378 | 10/1921 | Johnson | 120—95 X |
| 1,635,974 | 7/1927 | Meserole | 120—96 |
| 2,545,770 | 3/1951 | Harrison | 120—96 |
| 3,219,044 | 11/1965 | Bau | 120—42.03 X |

LAWRENCE CHARLES, *Primary Examiner.*